(12) United States Patent
Miyazaki et al.

(10) Patent No.: US 8,491,823 B2
(45) Date of Patent: *Jul. 23, 2013

(54) PROCESS FOR PRODUCING WATER-RESISTANT POLARIZING FILM

(75) Inventors: Junzo Miyazaki, Ibaraki (JP); Shoichi Matsuda, Ibaraki (JP); Kyoko Nishiguchi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 322 days.

This patent is subject to a terminal disclaimer.

(21) Appl. No.: 12/866,596

(22) PCT Filed: Jan. 23, 2009

(86) PCT No.: PCT/JP2009/051028
§ 371 (c)(1),
(2), (4) Date: Aug. 6, 2010

(87) PCT Pub. No.: WO2009/101849
PCT Pub. Date: Aug. 20, 2009

(65) Prior Publication Data
US 2010/0314784 A1 Dec. 16, 2010

(30) Foreign Application Priority Data
Feb. 13, 2008 (JP) ................. 2008-031346
Apr. 23, 2008 (JP) ................. 2008-112600

(51) Int. Cl.
| | |
|---|---|
| *B29D 7/01* | (2006.01) |
| *F21V 9/14* | (2006.01) |
| *G02B 5/30* | (2006.01) |
| *G02B 5/22* | (2006.01) |
| *G02B 5/23* | (2006.01) |
| *G02C 7/12* | (2006.01) |

(52) U.S. Cl.
USPC .................. 264/1.35; 106/287.26; 252/585; 252/586; 252/587; 359/350; 359/885; 427/163.1; 427/163.2; 430/7; 430/270.1; 534/577; 534/832

(58) Field of Classification Search
USPC ..... 106/287.26; 252/585, 586, 587; 264/1.35; 359/350, 885; 427/163.1, 163.2; 428/1.3, 428/212; 430/7, 270.1; 534/577, 832
See application file for complete search history.

(56) References Cited

U.S. PATENT DOCUMENTS

| | | | |
|---|---|---|---|
| 4,279,814 | A | 7/1981 | Smith |
| 5,739,296 | A | 4/1998 | Gvon et al. |
| 6,084,077 | A | 7/2000 | Kalweit |
| 8,282,864 | B2 * | 10/2012 | Umemoto et al. ............ 252/585 |
| 2009/0027597 | A1 * | 1/2009 | Iwakawa et al. ............. 349/75 |

FOREIGN PATENT DOCUMENTS

| | | | |
|---|---|---|---|
| JP | 61-213268 | A | 9/1986 |
| JP | 11-021538 | A | 1/1999 |
| JP | 2002-500688 | A | 1/2002 |
| JP | 2006-323377 | A | 11/2006 |
| JP | 2007-241269 | A | 9/2007 |
| WO | 94/28073 | A1 | 12/1994 |
| WO | 98/53009 | A1 | 11/1998 |
| WO | 2006/115206 | A1 | 11/2006 |

* cited by examiner

OTHER PUBLICATIONS

International Search Report of PCT/JP2009/051028, Mailing Date of Apr. 14, 2009.

*Primary Examiner* — Bijan Ahvazi
(74) *Attorney, Agent, or Firm* — Westerman, Hattori, Daniels & Adrian, LLP

(57) ABSTRACT

To obtain a water-resistant polarizing film free from deterioration in dichroic ratio caused by water-resistant treatment, it is critical that adjacent sulfonic acid groups or sulfonate groups in the organic dyes to be used for the polarizing film are spaced at moderate intervals. In a process for producing a water-resistant polarizing film of the present invention, the polarizing film before water-resistant treatment includes an organic dye which comprises an azo compound 20 represented by the following general formula (1) or (2)
[Chemical formula 1]
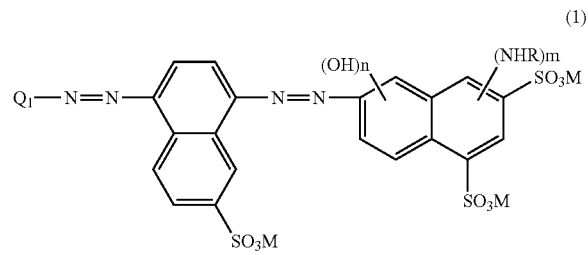
(1)
[Chemical formula 2]
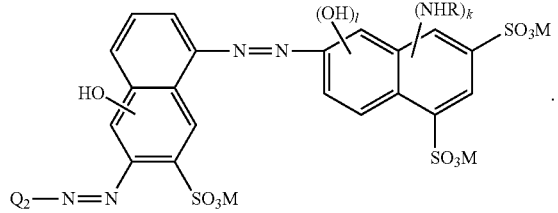
(2)
6 Claims, 1 Drawing Sheet

PROCESS FOR PRODUCING WATER-RESISTANT POLARIZING FILM

FIELD OF THE INVENTION

The present invention relates to a process for producing a water-resistant polarizing film in which organic dyes are oriented.

BACKGROUND OF THE INVENTION

In a liquid crystal panel, a polarizing plate is used to control optical rotation of light beams that pass through liquid crystals. Conventionally, in such a polarizing plate, a polarizing plate obtained by dying a polymer film, such as a polyvinyl alcohol or the like with iodine or a dichromatic dye and stretching the film in one direction has been widely used. However, there has been a problem that the aforementioned polarizing plate is poor in heat resistance and light resistance depending on the kind of the dye or the polymer film. Moreover, there is a drawback that the polarizing plate has a considerable great thickness.

In contrast, a method for forming a polarizing film by casting a coating solution including organic dyes exhibiting lyotropic liquid crystallinity on a substrate, such as a glass plate or a polymer film and the like to form a polarizing film by orienting the organic dyes is known. The organic dyes exhibiting lyotropic liquid crystallinity form supramolecular aggregates in the solution, so that the long axis direction of the supramolecular aggregates is oriented in a flowing direction when flowing after applying shearing stress onto the coating solution including this (JP 2006-323377 N. Such a polarizing film employing organic dyes does not need to be stretched and is easy to have a greater width because of no shrinkage in a width direction by stretching. Further, the polarizing film is expected to have potential because the thickness can be reduced significantly.

Conventionally, organic dyes having a sulfonate group where a sulfonic ion ($-SO_3^-$) is connected to a monovalent cation (e.g., $Li^+$) have been used for a portion of polarizing films in which organic dyes are aligned. Such polarizing films are poor in water resistance because a sulfonate group is ionized to be dissolved in water. In contrast, it is possible to obtain a water-resistant polarizing film which is insoluble or has poor solubility in water by substituting the monovalent cation of the sulfonate group for a divalent cation which is insoluble in water to be water-resistant treated (JP 11-21538 A).

In a conventional process for producing a water-resistant polarizing film, however, the orientation degree of organic dyes was deteriorated when the aforementioned water-resistant treatment was performed, which resulted in a problem of a decrease in dichroic ratio.

Conventional processes for producing a water-resistant polarizing film suffered from the deterioration of the orientation degree of organic dyes and dichroic ratio. It is an object of the present invention to provide a process for producing a water-resistant polarizing film which is free from the deterioration in the orientation degree of organic dyes and the dichroic ratio.

SUMMARY OF THE INVENTION

Inventors of the present invention carried out extensive investigations to obtain a polarizing film free from deterioration in dichroic ratio caused by water-resistant treatment. As a result, they have found out that it is critical that adjacent sulfonic acid groups or sulfonate groups in organic dyes to be used for the polarizing film are moderately spaced.

The gist of the present invention is described as follows:

In a first preferred embodiment, a process for producing a water-resistant polarizing film according to the present invention includes the step of performing water-resistant treatment by bringing a liquid including a divalent cation into contact with at least one surface of a polarizing film including an organic dye having at least two sulfonic acid groups or sulfonate groups, wherein the organic dye before the water-resistant treatment is an azo compound represented by the following general formula (1) or (2):

[Chemical formula 1]

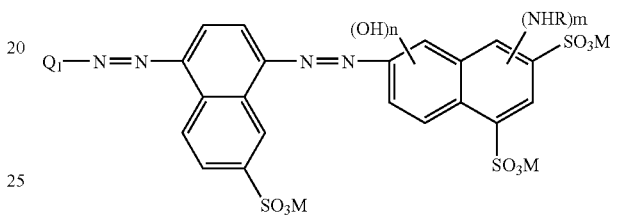

[Chemical formula 2]

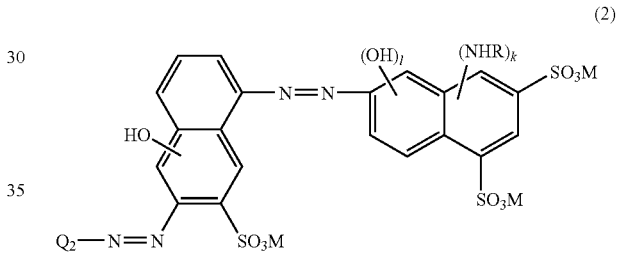

wherein $Q_1$ and $Q_2$ are respectively an aryl group which may have any substituent group; R is a hydrogen atom, an alkyl group having 1 to 3 carbon numbers, an acetyl group, a benzoyl group, or a phenyl group which may have any substituent group; m is an integer from 0 to 5; n is an integer from 0 to 5 (m+n$\leq$5, at least one of m and n is not 0); k is an integer from 0 to 5; l is an integer from 0 to 5 (k+l$\leq$5 and at least one of k and l is not 0); and M represents an element to provide a monovalent cation.

In a second preferred embodiment of the process for producing a water-resistant polarizing film according to the present invention, the azo compound is represented by the following general formula (3) or (4).

[Chemical formula 3]

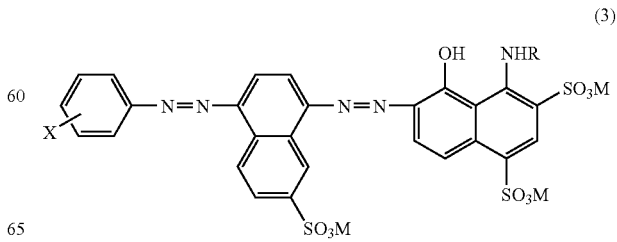

[chemical formula 4]

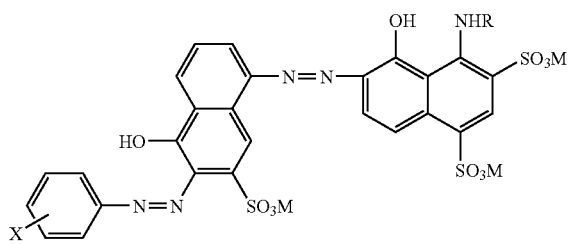

(4)

[Chemical formula 5]

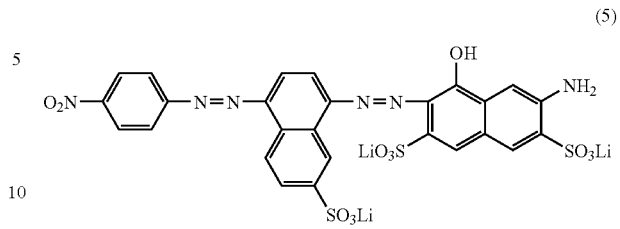

(5)

wherein X is a hydrogen atom, a halogen atom, a nitro group, a cyano group, an alkyl group having 1 to 4 carbon numbers, an alkoxy group having 1 to 4 carbon numbers or —$SO_3M$ group. R is a hydrogen atom, an alkyl group having 1 to 3 carbon numbers, an acetyl group, a benzoyl group or a phenyl group which may have any substituent group, and M represents an element to provide a monovalent cation.

In a third preferred embodiment of the process for producing a water-resistant polarizing film according to the present invention, the ionic radius of the divalent cation is 0.05 to 0.2 nm.

In a fourth preferred embodiment of the process for producing a water-resistant polarizing film according to the present invention, an ionic compound to provide the divalent cation in the liquid including the divalent cation has a concentration of 1 to 40%.

In a fifth preferred embodiment of the process for producing a water-resistant polarizing film according to the present invention, the liquid including the divalent cation has a liquid temperature of 5 to 60° C.

In a sixth preferred embodiment of the process for producing a water-resistant polarizing film according to the present invention, the liquid including the divalent cation is a barium chloride aqueous solution.

ADVANTAGE OF THE INVENTION

It is possible to obtain a water-resistant polarizing film whose dichroic ratio is unlikely to decrease by employing an organic dye in which the position of adjacent sulfonic acid groups or sulfonate groups is spaced at moderate intervals, even after water-resistant treatment is performed.

For a full understanding of the present invention, reference should now be made to the following detailed description of the preferred embodiments of the invention as illustrated in the accompanying drawings.

DESCRIPTION OF THE PREFERRED EMBODIMENTS

The present inventors have intensively studied so as to resolve the aforementioned problem and they have found out that the position of adjacent sulfonic acid groups or sulfonate groups used for a polarizing film to be subject to water-resistant treatment is critical so as to obtain a water-resistant polarizing film whose dichroic ratio is less likely to decrease.

An azo compound which has been conventionally used as an organic dye is typically represented by the following structural formula (5);

As schematically shown in FIG. 1(a), in an azo compound 10 represented by the structural formula (5), adjacent sulfonic ions 11 were located close to each other, so that the azo compound 10 became bent or twisted, resulting in lost of its linearity when monovalent cations 12 having a small ionic radius were exchanged for a divalent cation 13 having a large ionic radius. This led to deterioration in dichroic ratio of the resultant water-resistant polarizing film.

On the contrary, an azo compound to be used in the present invention is typically represented by the following structural formula (6):

[Chemical Formula 6]

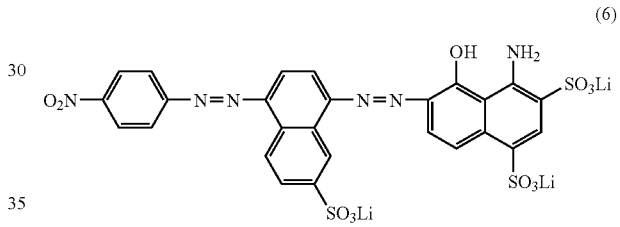

(6)

As schematically shown in FIG. 1(b), it is possible to maintain the linearity of an azo compound 20 represented by the structural formula (6) even after monovalent cations 22 having a small ionic radius were exchanged for a divalent cation 23 having a large ionic radius because adjacent sulfonic ions 21 are spaced at moderate intervals. As a result, it is possible to prevent the dichroic ratio of the water-resistant polarizing film from being deteriorated caused by water-resistant treatment.

[Process for Producing Water-Resistant Polarizing Film]

A process for producing a water-resistant polarizing film of the present invention includes the step of performing water-resistant treatment by bringing a liquid including a divalent cation into contact with at least one surface of the polarizing film including an organic dye having at least two sulfonic acid groups or sulfonate groups, wherein the organic dye before being water-resistant treated is a specific azo compound. According to the production process of the present invention, it is possible to set an absolute value of the change rate of the dichroic ratio of the polarizing film caused by the water-resistant treatment preferably at 15% or lower, more preferably, at 10% or lower. The process for producing a water-resistant polarizing film of the present invention is not particularly limited as long as it satisfies the aforementioned features, but may include any processes. Typically, the process for producing a water-resistant polarizing film of the present invention may include the steps of: bringing a liquid including a divalent cation into contact with one surface of the polarizing film; subsequently washing the adhered liquid in water; and drying the liquid.

[Polarizing Film before Water-Resistant Treatment]

In the process for producing a water-resistant polarizing film of the present invention, the polarizing film before water-resistant treatment includes an organic dye which comprises an azo compound represented by the following general formula (1) or (2), wherein $Q_1$ and $Q_2$ respectively represent an aryl group which may have any substituent group. R is a hydrogen atom, an alkyl group having 1 to 3 carbon numbers, an acetyl group, a benzoyl group, or a phenyl group which may have any substituent group; m is an integer from 0 to 5; n is an integer from 0 to 5 (m+n≦5, at least one of m and n is not 0); k is an integer from 0 to 5; l is an integer from 0 to 5 (k+l≦5, at least one of k and l is not 0); and M is an element to provide a monovalent cation, preferably a hydrogen atom or an alkali metal atom.

[Chemical formula 1]

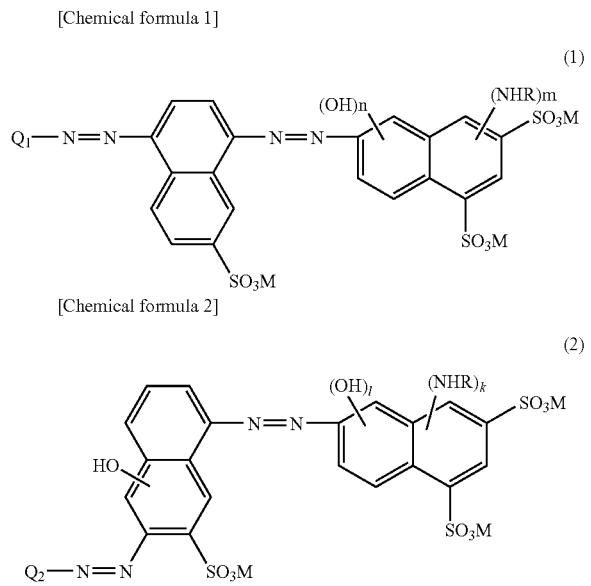

[Chemical formula 2]

The polarizing film before water-resistant treatment preferably includes the azo compound represented by the aforementioned general formula (1) or (2) 50 to 100 weight % out of the total weight of the polarizing film.

In the organic dyes that comprises an azo compound represented by the general formula (1) or (2), even when a monovalent cation (M) is exchanged for a divalent cation, the linearity of the azo compound is maintained because the sulfonic ions are spaced at moderate intervals. This allows the orientation degree and the dicrotic ration of the water-resistant polarizing film to be maintained before and after the water-resistant treatment. The substitution position of the hydroxyl group (—OH) and the amino group (—NHR) is not particularly limited, but may be substituted for any position of a naphthalene backbone.

The polarizing film before water-resistant treatment more preferably includes an organic dye which comprises the azo compound represented by the following general formula (3) or (4). In the general formulae (3) and (4), R and M are the same as those in the general formulae (1) and (2). X is a hydrogen atom, a halogen atom, a nitro group, a cyano croup, an alkyl group having 1 to 4 carbon numbers, an alkoxy group having 1 to 4 carbon numbers, or —SO₃M group. The organic dye composed of the azo compound represented by the general formula (3) or (4) exhibits stable liquid crystallinity and a polarizing film having a high dichoric ratio may be obtained.

[Chemical formula 3]

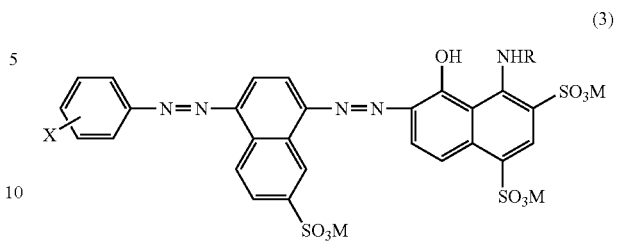

[Chemical formula 4]

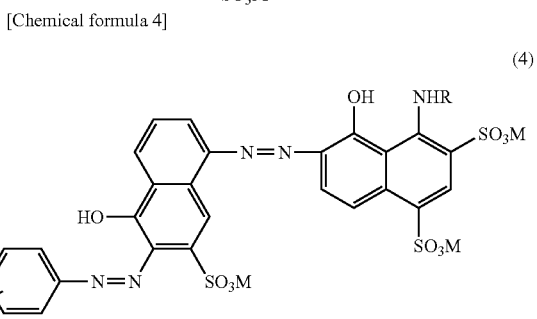

It is possible to obtain the azo compound represented by the general formulae (1) to (4) by diazotizing and coupling an aromatic compound having an amino acid (e.g., an aniline derivative and an amino naphthalene derivative) and a naphthalene sulfonate derivative in accordance with a conventional method and the obtained monoazo compound is subject to diazotization and coupling reaction with amino naphthalene sulfonic acid derivative.

Examples of the aforementioned naphthalene sulfonic acid derivative typically include 8-amino-2-naphthalene sulfonic acid, 5-amino-1-naphthol-3 sulfonic acid hydrate or the like. And examples of the amino naphthalene sulfonic acid derivative include 1-amino-8-naphthol-2,4-disulfonate, 7-amino-1, 3-naphthalene disulfonate, 2-naphthol-6,8-disulfonate or the like.

The polarizing film before water-resistant treatment may include other organic dyes in addition to the azo compound represented by the aforementioned general formulae (1) to (4). Examples of the other organic dyes include azo compounds, anthraquinone compounds, perylene compounds, quinophthalone compounds, naphthoquinonic compounds, and merocyanine compounds or the like. These organic dyes preferably have two or more sulfonic acid groups or sulfonate groups.

It is possible to obtain the polarizing film before water-resistant treatment by typically casting a coating solution including an azo compound represented by the general formulas (1) to (4) and a solvent and then being dried. The aforementioned azo compound may be oriented by flowing when applying shearing force in a liquid crystal state. The aforementioned azo compound forms supramolecular aggregates in the coating solution. Accordingly, the long axis direction of the supramolecular aggregates is oriented in the flowing direction by casting the coating solution while applying shearing force to the coating solution to flow. In addition to shearing force, an orientation means may combine orientation treatment, such as rubbing treatment and optical orientation or the like and orientation by a magnetic field and an electric field.

Solvents to be used in the present invention are not particularly limited, but hydrophilic solvents are preferably used as solvents. The aforementioned hydrophilic solvents are preferably water, alcohol kinds, cellosolve kinds and mixture thereof. Water-soluble compounds, such as glycerin, ethyleneglycol or the like may be added to the solvents. These additives can be used to control readily solubility and the drying rate of the liquid crystalline coating solution.

[Water-Resistant Treatment]

Water-resistant treatment to be used in a process for producing a water-resistant polarizing film of the present invention is to bring a liquid including a divalent cation into contact with at least one surface of the polarizing film including an organic dye having at least two sulfonic acid groups or sulfonate groups mentioned above.

The aforementioned divalent cation is not particularly limited, but typically includes an alkaline-earth metal ion or a metal ion. Examples of a metal ion includes, for instance, $Ba^{2+}$, $Ni^{2+}$, $Cu^{2+}$, $Zn^{2+}$, $Pd^{2+}$, $cd^{2+}$, $Sn^{2+}$, $Co^{2+}$ or $Mn^{2+}$ and the like. The aforementioned divalent cation may be used as one kind and may be used in combination of two kinds or more.

The inonic radius of the aforementioned divalent cation is preferably 0.05 to 0.2 nm, more preferably 0.1 to 0.18 nm. When the inonic radius of the divalent cation is too large, there is a possibility that linearity of the azo compound may be lost, which may result in deterioration in dichroic ratio. When the inonic radius of the divalent cation is too small, there is a possibility for an ion exchange not being performed, which may result in no water-resistance is obtained.

An aqueous chloride solution to provide a divalent cation (e.g., barium chloride solution, lead chloride solution) thereof may be typically used for a liquid including the aforementioned divalent cation.

An ionic compound to provide the aforementioned divalent cation in the liquid including the aforementioned divalent cation preferably has a concentration of 1 to 40%, more preferably 5 to 40%. There are fears that handling of the ionic compound may be difficult when the concentration is too high. And there are fears that no sufficient effects may be obtained when the concentration is too low.

The liquid temperature of the liquid including the aforementioned divalent cation is preferably 5 to 60° C., more preferably 10 to 40° C. When the liquid temperature is too high or too low, there are fears that cracks may occur on the water-resistant polarizing film after being water-resistant treated or the water-resistant polarizing film may become cloudy.

The liquid including the aforementioned divalent cation is preferably a barium chloride solution. Since a barium chloride solution is neutral, there is no possibility of an application coater being corrosive and it is easy to industrially obtain the solution.

The means for bringing the liquid including the aforementioned divalent cation into contact with at least one surface of the aforementioned divalent cation is not particularly limited, but, for instance, the polarizing film may be immersed into a liquid including a divalent cation, alternatively, the liquid including a divalent cation may be applied on the surface of the polarizing film.

[Water-Resistant Polarizing Film]

It is possible to obtain a water-resistant polarizing film of the present invention by subjecting the polarizing film including an organic dye which comprises the azo compound represented by the aforementioned general formulae (1) to (4) to the aforementioned water-resistant treatment. The water-resistant polarizing film is not particularly limited as long as the water-resistant polarizing film includes a substance in which a monovalent cation (M) is substituted for a divalent cation in the aforementioned general formulae (1) to (4). The water-resistant polarizing film may typically include a monovalent cation (M) alone without the substitution of a part of the aforementioned monovalent cation (M). In this case, the remained amount of the monovalent cation (M) is preferably 20 or less with respect to 100 divalent cations.

The water-resistant polarizing film of the present invention exhibits absorption dichroism at least at one wavelength in a visible light region (at a wavelength of 380 to 780 nm). The thickness of the water-resistant polarizing film is preferably 0.1 to 3 μm and the dichroic ratio thereof is preferably 11 or more.

[Applications of Water-Resistant Polarizing Film]

The water-resistant polarizing film of the present invention is preferably used as a polarizing element. The polarizing element is applied to various kinds of liquid crystal display apparatuses, such as computers, copy machines, mobile phones, watches, digital cameras, Personal Digital Assistance (PDA), portable game devices, video cameras, television units, microwave oven, monitors for car navigation system, car audio videos, monitors for information for stores, supervisory monitors, and monitors for medical purposes or the like. The water-resistant polarizing film of the present invention may be used after being released from the substrate or may be used in the state that the polarizing film is laminated on the substrate. When the polarizing film is used for an optical application while the polarizing film is laminated on the substrate, the substrate is preferably transparent to visible light. The polarizing film may be used in the state of being laminated on other support or an optical element when the polarizing film is released from the substrate.

EXAMPLES

The present invention will be more clearly understood by referring to the Examples below. However, the Examples should not be construed to limit the invention in any way.

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to diazotization and coupling reaction with 1-amino-8-naphthol-2,4-disulfonate lithium salt to obtain a rough product including an azo compound having the following structural formula (6) and salting out was carried out with lithium chloride to obtain an azo compound having the following structural formula (6):

[Chemical formula 6]

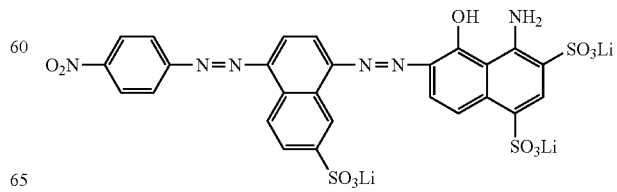

(6)

The azo compound of the aforementioned structural formula (6) was dissolved in ion-exchange water to prepare a coating solution having an azo compound concentration of 20% by weight. The coating solution was obtained with a polyethylene dropper and was sandwiched by two pieces of slide glasses. A nematic liquid crystal phase was observed when observing with a polarization microscope at room temperature (23° C.).

The coating solution was cast by flowing on the surface of a norbornene polymer film (produced by Nippon Zeon Co., Ltd., product name "Zeonor") with rubbing treatment and corona treatment in a thin film state using a bar coater (produced by BUSCHMAN, product name "Mayerrot HS4") to obtain a laminate composed of the polarizing film and the norbornene polymer film by natural drying in a temperature-controlled room at 23° C. The polarizing film had a thickness of 0.4 μm.

The laminate composed of the aforementioned polarizing film and the nornornene polymer film was immersed into a-20% barium chloride solution (Product name: "Special Grade" produced by KISHIDA CHEMICAL CO., LTD., ionic radius=0.149 nm) at the liquid temperature of 15° C. for 5 seconds so as to allow the surface of the polarizing film to be water-resistant treated by washing the laminate in ion-exchange water. Thus obtained water-resistant polarizing film was not dissolved even after being washed in water. Table 1 shows optical characteristics of the laminate having the aforementioned water-resistant polarizing film. Since the norbornene polymer film of the substrate has substantially isotropic properties, the optical characteristics of the laminate are substantially the same as those of the water-resistant polarizing film.

Example 2

An azo compound of the following structural formula (7) was obtained in the same manner as in Example 1 except for changing 4-nitroaniline to p-anisidine.

[Chemical formula 7]

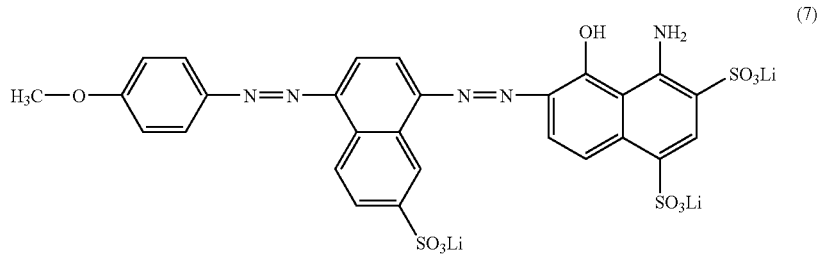

(7)

The azo compound of the aforementioned structural formula (7) was dissolved in ion-exchange water to prepare a coating solution with a concentration of the azo compound of 20% by weight. The coating solution was obtained with a polyethylene dropper and was sandwiched by two pieces of slide glasses. A nematic liquid crystal phase was observed when observing with a polarization microscope at room temperature (23° C.).

The aforementioned coating solution was used to prepare a laminate composed of a polarizing film and a water-resistant polarizing film in the same manner as in Example 1. Table 1 shows optical characteristics of the obtained laminate having a water-resistant polarizing film.

Example 3

An azo compound of the following structural formula (8) was obtained in the same manner as in Example 1 except for changing 4-nitroaniline to p-toluidine.

[Chemical formula 8]

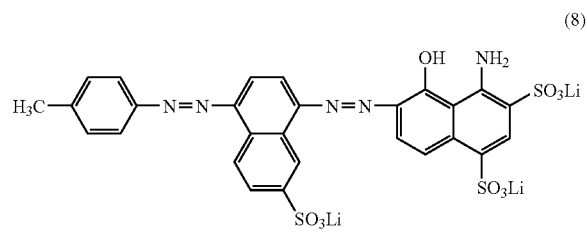

(8)

The azo compound of the aforementioned structural formula (8) was dissolved in ion-exchange water to prepare a coating solution with a concentration of the azo compound of 20% by weight. The coating solution was obtained with a polyethylene dropper and was sandwiched by two pieces of slide glasses. A nematic liquid crystal phase was observed when observing with a polarization microscope at room temperature (23° C.).

The aforementioned coating solution was used to prepare a laminate composed of a polarizing film and a water-resistant polarizing film in the same manner as in Example 1. Table 1 shows optical characteristics of the obtained laminate having a water-resistant polarizing film.

Example 4

An azo compound of the following structural formula (9) was obtained in the same manner as in Example 1 except for changing 8-amino-2-naphthalene sulfonic acid to 5-amino-1-naphthol-3-sulfonate hydrate.

[Chemical formula 9]

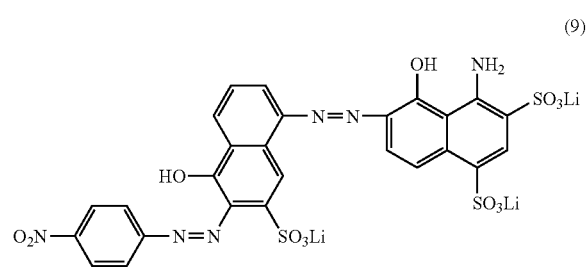

(9)

The azo compound of the aforementioned structural formula (9) was dissolved in ion-exchange water to prepare a coating solution having a concentration of the azo compound of 20% by weight. The coating solution was obtained with a polyethylene dropper and was sandwiched by two pieces of slide glasses. A nematic liquid crystal phase was observed when observing with a polarization microscope at room temperature (23° C.).

The aforementioned coating solution was used to prepare a laminate composed of a polarizing film and a water-resistant polarizing film in the same manner as in Example 1. Table 1 shows optical characteristics of the obtained laminate having a water-resistant polarizing film.

Comparative Example 1

An azo compound of the following structural formula (5) was obtained in the same manner as in Example 1 except for changing 1-amino-8-naphthol-2,4-disulfonate lithium salt to 7-amino-1-naphthol-3,6-disulfonate lithium salt.

[Chemical formula 5]

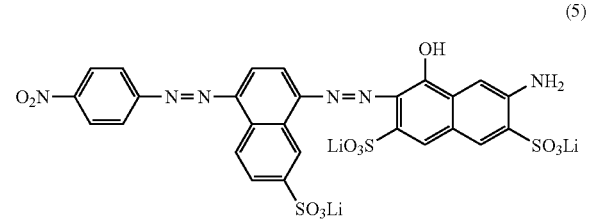

(5)

The azo compound of the aforementioned structural formula (5) was dissolved in ion-exchange water to prepare a coating solution having an azo compound concentration of 20% by weight. The coating solution was obtained with a polyethylene dropper and was sandwiched by two pieces of slide glasses. A nematic liquid crystal phase was observed when observing with a polarization microscope at room temperature (23° C.).

The aforementioned coating solution was used to prepare a laminate composed of a polarizing film and a water-resistant polarizing film in the same manner as in Example 1. Table 1 shows optical characteristics of the obtained laminate having a water-resistant polarizing film.

Comparative Example 2

An azo compound of the following structural formula (10) was obtained in the same manner as in Example 1 except for changing 4-nitroaniline to p-anisidine.

[Chemical formula 10]

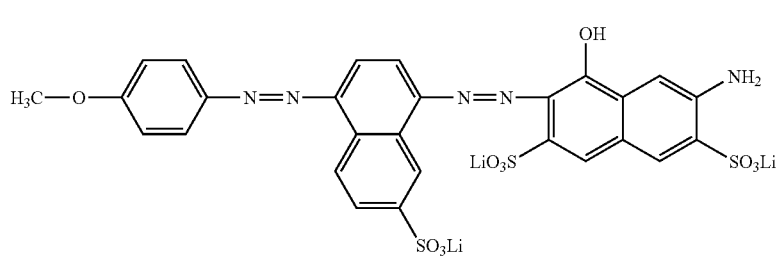

(10)

The azo compound of the aforementioned structural formula (10) was dissolved in ion-exchange water to prepare a coating solution having an azo compound concentration of 20% by weight. The coating solution had a pH of 6.0. The coating solution was obtained with a polyethylene dropper and was sandwiched by two pieces of slide glasses. A nematic liquid crystal phase was observed when observing with a polarization microscope at room temperature (23° C.).

The aforementioned coating solution was used to prepare a laminate composed of a polarizing film and a water-resistant polarizing film in the same manner as in Example 1. Table 1 shows optical characteristics of the obtained laminate having a water-resistant polarizing film.

Comparative Example 3

An azo compound of the following structural formula (11) was obtained in the same manner as in Example 1 except for changing 4-nitroaniline to p-toluidine.

[Chemical formula 11]

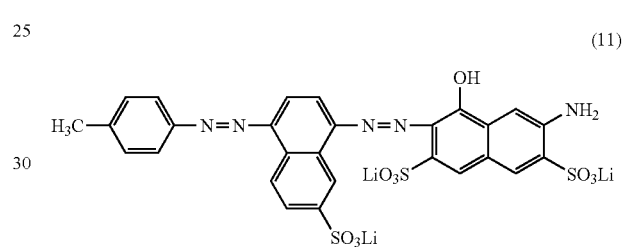

(11)

The azo compound of the aforementioned structural formula (11) was dissolved in ion-exchange water to prepare a coating solution having an azo compound concentration of 20% by weight. The coating solution had a pH of 6.0. The coating solution was obtained with a polyethylene dropper and was sandwiched by two pieces of slide glasses. A nematic liquid crystal phase was observed when observing with a polarization microscope at room temperature (23° C.).

The aforementioned coating solution was used to prepare a laminate composed of a polarizing film and a water-resistant polarizing film in the same manner as in Example 1. Table 1 shows optical characteristics of the obtained laminate having a water-resistant polarizing film.

TABLE 1

|  | Dichroic ratio of polarizing films | | | |
|---|---|---|---|---|
| Organic dye compound No. | Before water-resistant treatment | After water-resistant treatment | Change amount | Change rate(%) |
| Example 1 | (6) | 13 | 12 | −1 | −7.7 |
| Example 2 | (7) | 13 | 13 | 0 | 0 |
| Example 3 | (8) | 23 | 19 | −4 | −17.4 |
| Example 4 | (9) | 10 | 10 | 0 | 0.0 |
| Comparative Example 1 | (5) | 15 | 10 | −5 | −33.3 |
| Comparative Example 2 | (10) | 15 | 11 | −4 | −26.7 |
| Comparative Example 3 | (11) | 20 | 12 | −8 | −40.0 |

Amount of change = (Dichroic ratio after water-resistant treatment) − (Dichroic ratio before water resistant treatment)
Change rate = (Amount of change)/(Dichroic ratio before water-resistant treatment)

[Evaluation]
(1) Compared with Example 1 (Formula 6) and Comparative Example 1 (Formula 5), the change rate of the dichroic ratio greatly differs due to the difference of the position of —$SO_3Li$. However, the difference of the dichroic ratio before the change comparatively differs slightly.
(2) Compared with Example 2 (Formula 7) and Comparative Example 2 (Formula 10), the change rate of the dichroic ratio greatly differs due to the difference of the position of —$SO_3Li$. However, the difference of the dichroic ratio before the change comparatively differs slightly.
(3) Compared with Example 3 (Formula 8) and Comparative Example 3 (Formula II), the change rate of the dichroic ratio greatly differs due to the difference of the position of —$SO_3Li$. However, the difference of the dichroic ratio before the change comparatively differs slightly.
(4) In comparison among Example 1 (Formula 6), Example 2 (Formula 7), and Example 3 (Formula 8), $CH_3O$— (Example 2) is extremely small in the change rate of the dichroic ratio and subsequently, —$NO_2$ (Example 1) is next to $CH_3O$— (Example 2), and $CH_3$— (Example 3) is a little large. However, the absolute value of the dichroic ratio of $CH_3$— (Example 3) is large and the absolute value of the dichroic ratio of $CH_3O$— (Example 2) and —$NO_2$ (Example 1) is slightly small.
(5) Compared with Example 1 (Formula 6) and Example 4 (Formula 9), the change rate of the dichroic ratio of both examples is extremely small. However, the absolute value of the dichroic ratio of both examples is slightly small.
(6) While $CH_3$-(Example 3) has a slightly large change rate of the dichroic ratio, —$NO_2$ (Example 1, Example 4) and $CH_3O$— (Example 2) respectively have a small change rate of the dichroic ratio.
(7) While $CH_3$— (Example 3, Comparative Example 3) has a large absolute value of the dichoric ratio, —$NO_2$ (Example 1, Example 4, and Comparative Example 1) and $CH_3$— (Example 2, Comparative Example 2) respectively have a slightly small change rate of the dichroic ratio.

[Measurement Method]
[Observation of Liquid Crystal Phase]
The coating solution was obtained using a polyethylene dropper and was sandwiched by two pieces of slide glasses (produced by Matsunami Glass Ind. Ltd., product name: "MATSUNAMI SLIDE GLASS") to observe using a polarization microscope (manufactured by Olympus, product name: "OPTIPHOT-POL") at room temperature (23° C.).

[Measurement of Thickness]
A portion of a polarizing film was released to obtain the thickness of the polarizing film by measuring the level difference using a three-dimensional measurement system of the shape of a non-contact surface (manufactured by Ryoka Systems, Inc., product name: "MM5200").

[Measurement of Dichroic Ratio]
The following equation was calculated by a value measured using a spectrophotometer with Glan-Thompson polarizer (produced by JASCO Corporation, product name: V-7100):

$$\text{Dichroic ratio} = \{-\log(1-P/100) \times Y_s/100\}/\{-\log(1+P/100) \times Y_s/100\} \quad P = (Y_p - Y_c)/(Y_p + Y_c)^{1/2} \times 100$$

wherein $Y_s$ is simplicial transmittance and $Y_p$ is parallel transmittance, and $Y_c$ is orthogonal transmittance.

Figure 1:
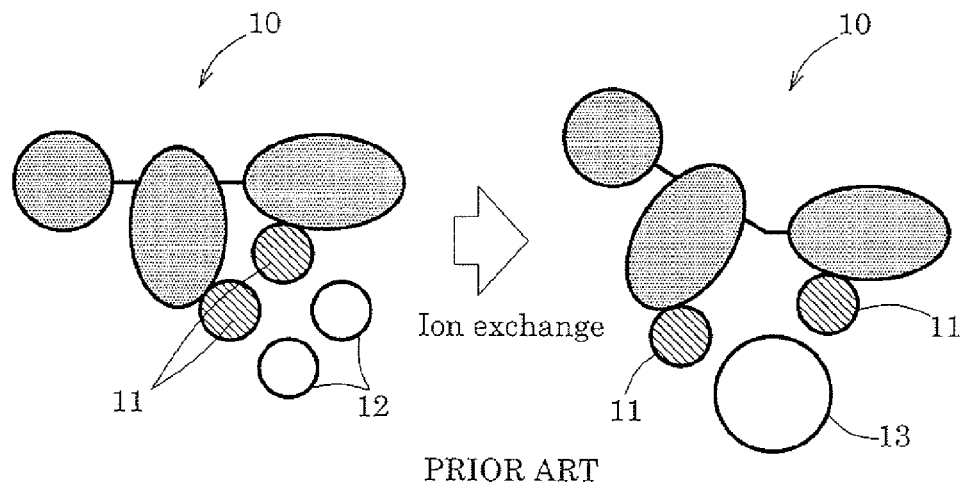
FIGS. 1(a) and 1(b) are respectively a schematic view illustrating changes of linearity of an azo compound caused by an ion exchange.
Figure 1:
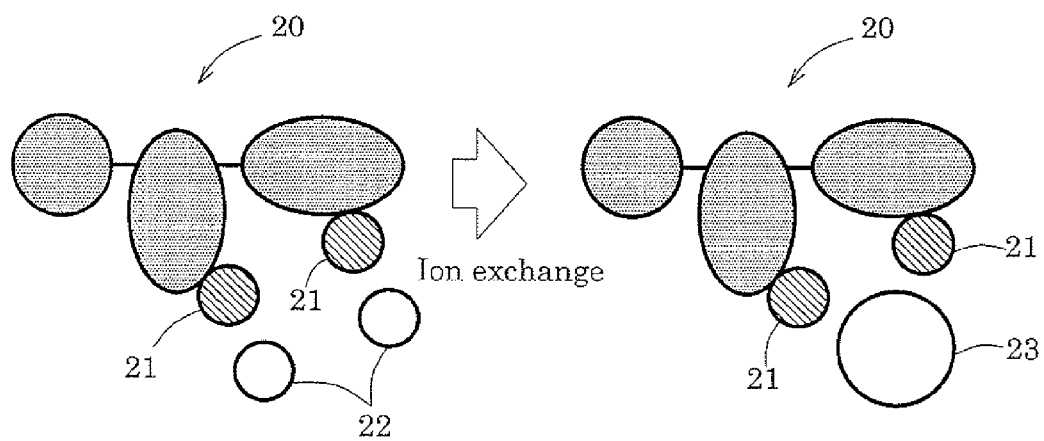

There has thus been shown and described a novel process for producing a water-resistant polarizing film, which fulfills all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A process for producing a water-resistant polarizing film comprising the step of performing water-resistant treatment by bringing a liquid including a divalent cation into contact with at least one surface of a polarizing film including an organic dye having at least two sulfonic acid groups or sulfonate groups, wherein the organic dye before the water-resistant treatment is an azo compound represented by the following general formula (1):

[Chemical formula 1]

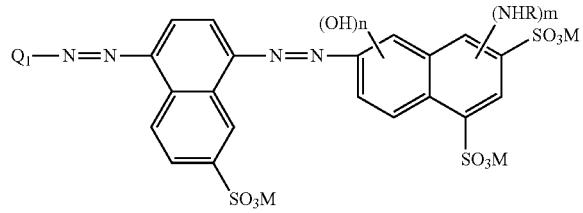

(1)

wherein Q1 is an aryl group which has a substituent group; R is a hydrogen atom, an alkyl group having 1 to 3 carbon numbers, an acetyl group, a benzoyl group, or a phenyl group which has a substituent group; m is an integer from 0 to 5, n is an integer from 0 to 5 in which m+n≦5, and at least one of m and n is not 0; and M represents an element to provide a monovalent cation.

2. The process according to claim 1, wherein the azo compound is represented by the following general formula (3):

[Chemical formula 3]

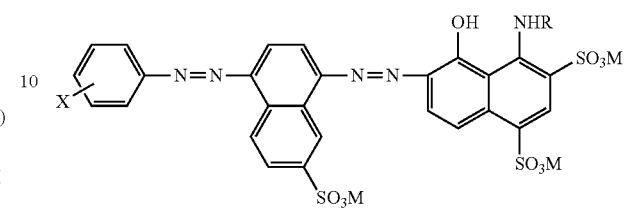

(3)

wherein X is a hydrogen atom, a halogen atom, a nitro group, a cyano group, an alkyl group having 1 to 4 carbon numbers, an alkoxy group having 1 to 4 carbon numbers or —$SO_3M$ group, R is a hydrogen atom, an alkyl group having 1 to 3 carbon numbers, an acetyl group, a benzoyl group or a phenyl group which has a substituent group, and M represents an element to provide a monovalent cation.

3. The process according to claim 1 or claim 2, wherein the ionic radius of the divalent cation is 0.05 to 0.2 nm.

4. The process according to claim 1 or claim 2, wherein an ionic compound to provide the divalent cation in the liquid including the divalent cation has a concentration of 1 to 40%.

5. The process according to claim 1 or claim 2, wherein the liquid including the divalent cation has a liquid temperature of 5 to 60° C.

6. The process according to claim 1 or claim 2, wherein the liquid including the divalent cation is a barium chloride aqueous solution.

* * * * *